Patented July 11, 1950

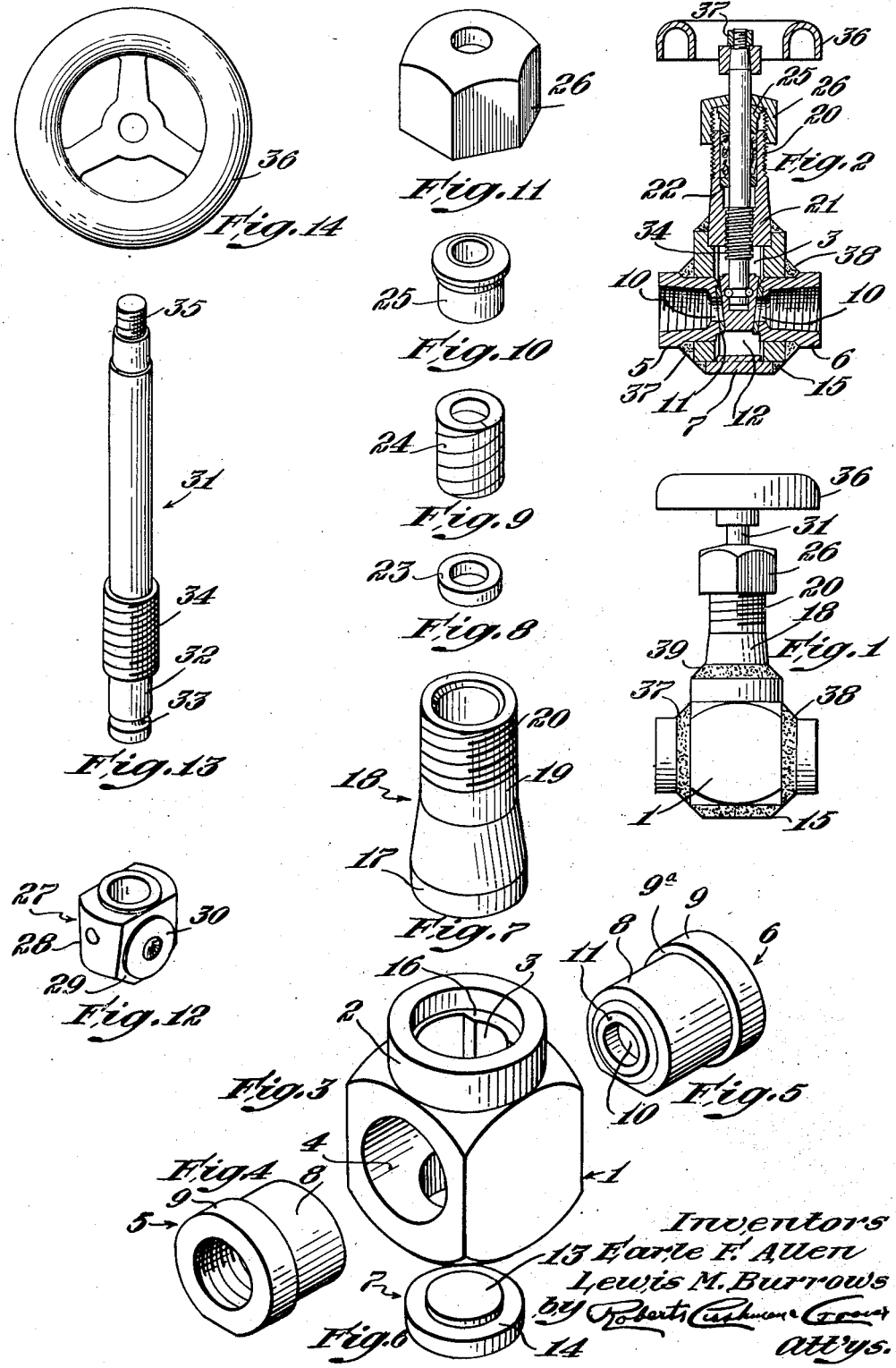

2,514,532

UNITED STATES PATENT OFFICE 2,514,532

FLOW CONTROL VALVE

Earle F. Allen, Wellesley Hills, and Lewis M. Burrows, North Quincy, Mass., assignors to Manning, Maxwell & Moore, Incorporated, New York, N. Y., a corporation of New Jersey Application August 24, 1944, Serial No. 550,965

1 Claim. (Cl. 251—156)

This invention pertains to valves of the kind employed for controlling fluid flow, for instance, for controlling the flow of water or steam in a pipe line. Among the objects of the invention are to provide a valve of minimum external dimensions and weight, but which at the same time is as strong or stronger than valves of similar capacity made in accordance with prior practice; to provide a valve which may be made very cheaply and by high speed production methods, and which requires a minimum degree of skill and care in assembling its parts; to provide a valve having a very accurately finished seat surface or surfaces, preferably of a material which is harder and more wear-resistant than the material of the valve casing or body; to provide a gate valve having spaced opposed seat surfaces which are accurately finished and located so that the valve head may contact both seats simultaneously and leak-tight, and whereby as a consequence of such accuracy of shape and location the valve head may be moved much more easily toward and from its seat than in prior valves of the same size and type; to provide a valve wherein the valve head may be seated against a back seat when fully open, thereby to relieve the packing of some or all of the fluid pressure when the valve is open; to provide a valve comprising a minimum number of parts and whose interior, after assembly, is permanently sealed so that the internal parts can not be disturbed by the casual tinkerer; and to provide a valve of pleasing external appearance. Other and further objects and advantages of the invention will be pointed out in the following more detailed description and by reference to the accompanying drawings wherein Fig. 1 is a side elevation of the valve of the present invention;

Fig. 2 is a diametrical vertical section of the valve, the valve being closed;

Fig. 3 is a perspective view of the central block of the valve body before assembly with other constituent parts of the valve body;

Figs. 4 and 5 are perspective views of inlet and outlet plugs or closures constituting parts of the completed valve body;

Fig. 6 is a perspective view of a bottom closure for the valve body;

Fig. 7 is a perspective view of the valve stem-guiding sleeve which also constitutes a part of the completed valve body;

Fig. 8 is a perspective view of a collar or washer which supports the stem packing;

Fig. 9 is a perspective view of the stem packing;

Fig. 10 is a perspective view of the packing gland;

Fig. 11 is a perspective view of the gland-actuating nut;

Fig. 12 is a perspective view of the valve head;

Fig. 13 is a perspective view of the valve stem; and

Fig. 14 is a plan view of the valve-actuating handle or wheel.

Referring to the drawings, the numeral 1 designates a block constituting the central or main portion of the valve body, this block preferably being an integral mass of metal, for example, a piece of square carbon steel bar stock turned at its top to provide the cylindrical bonnet portion 2, and having a cylindrical vertical bore 3 and a cylindrical horizontal bore 4, said bores each extending completely through the block and having their axes intersecting at right angles, the intersecting portions of these bores constituting the valve chamber.

Inlet and outlet plugs or closures 5 and 6 respectively and which may be identical in shape and dimensions, if desired, are formed for example by turning them from bar stock, each comprising an inner cylindrical portion 8 of a diameter such that it may fit within one end respectively of the transverse bore 4 in the block 1 and of a length such that in the completed valve its inner end is within the valve chamber, and each preferably having an outer end portion 9 of greater diameter than the portion 8, the parts 8 and 9 of each plug meeting at a substantially radial shoulder 9ª. These plugs or closure members 5 and 6 have axial flow passages 10 and the inner ends of these plugs are preferably, though not necessarily, formed to lie in planes inclined to the axes of the respective plugs, the inclination of the end surfaces of the two plugs preferably being the same. As illustrated, the inlet and outlet portions of the horizontal bore 3 are each of a substantial length approximating the diameter of the flow passages 10 in the plugs 5 and 6 so that, when the plugs are assembled with the valve body, an exceedingly strong structure results.

For convenience the plugs 5 and 6, although tubular, are herein referred to together with the member 7 as "closures" as they at least partially close the ends of the transverse bore 4 in the block 1. These plugs 5 and 6 may be internally screw threaded for engagement with threaded pipe connections, or may be left without threads if the pipe connections are to be welded to the valve. While the valve seat surfaces as specifically illustrated are disposed in inclined planes it is within the scope of the invention to make these valve seat surfaces parallel, the valve head being correspondingly shaped.

Ordinarily and to reduce expense, the members 5 and 6 will be made of the same metal as the block 1, for instance carbon steel, but to insure accuracy of operation and long life it is preferred to provide the inner ends of the plugs with facings or inserts of wear-resistant material to form the valve seats. Thus, for example, the inner end of each plug may be provided with an annular recess and this recess may be filled with some very wear-resistant and corrosion-resistant material, such for example as stainless steel or Stellite. Such wear-resistant material is preferably molecularly united to the plug proper, as for example by welding, or in the case of Stellite by fusing it into place. After the wear-resistant material has thus been applied to the inner end of the plug and before the plug is assembled with the block 1, the wear-resistant material is accurately ground to provide a true flat surface to constitute the valve seat. This accurate finishing of the surfaces is readily performed, since at this time the plugs are not assembled with the block 1 and the seat surfaces are fully exposed, and the plugs may readily be set up in the machine for the accomplishment of the finishing operation.

The lower closure member 7 is preferably a short cylindrical piece of material, having a central button 13 designed to be disposed within the lower end of the bore 3 in the block 1 and to form the floor of the valve chamber 12, the closure member 7 having the flange portion 14 which engages the under side of the block 1 at the margin of the bore 3, and which is molecularly united to the block 1, for example by an annulus of welding metal 15, as hereafter described.

The bore 3 in the block 1 is preferably provided with an internal shoulder 16 (Fig. 3) forming a seat for the lower portion 17 of the stem-guiding sleeve 18. This lower portion 17 of the sleeve preferably fits snugly within the upper end of the bore 3, but in order to reduce weight the guiding sleeve 18 is preferably tapered upwardly from the part 17, eventually merging with the cylindrical portion 19 of smaller diameter than the part 17 and which is externally screw threaded at 20, the sleeve 18 also being internally screw threaded at its lower part at 21 (Fig. 2). The sleeve 18 also has an internal shoulder at 22 (Fig. 2) designed to support a rigid collar or washer 23 upon which rests the stem packing 24, the latter being housed within the upper part of the bore in the stem guide 18. A gland 25 is arranged to slide in the upper part of the bore in the stem-guiding sleeve 18 so as to compress the packing 24, the gland being actuated by means of a nut 26 which engages the external screw threads 20 on the stem-guiding sleeve.

The valve head 27 (Fig. 12) is preferably a solid block of material having the opposite, substantially flat surfaces 28 and 29 which are inclined and whose planes intersect at the same angle as the planes of the valve seat surfaces 11 of the completed valve body. Preferably these surfaces 28 and 29 are faced with wear-resistant material at 30, accurately finished to contact, leak-tight with the seat surfaces of the plugs. The valve head is furnished with an axial bore leading down from its upper end (Fig. 2) designed to receive the lower end portion 32 of the valve stem 31. This valve stem is an integral piece of material preferably having a peripheral groove 33 near its lower end designed to receive a series of ball bearings (Fig. 2) or other equivalent devices, which interlock with the head and provide a swivel connection between the stem and the head, although positively uniting the head and stem with respect to axial movement of said parts. The stem is provided with an externally screw-threaded portion 34 for engagement with the screw threads 21 of the sleeve 18, and at its upper end is threaded at 35 for engagement by a nut 37 which holds the hand wheel 36 on the upper end of the stem.

While the screw-threaded portion 21 of the bore in the stem guide 18 is of a diameter sufficient to receive the threaded portion 34 of the stem, it is not large enough to permit the valve head to pass through it. Thus, when assembling the parts constituting the valve body, it is necessary first to attach the valve head to the stem before the stem-guiding sleeve 18 is secured to the block 1. The upper surface of the valve head is so designed that when the valve is wide open, it engages the under surface of the stem-guiding sleeve 18, and thus forms a leak-tight closure to prevent leakage of fluid along the stem.

After having secured the valve head to the stem and having threaded the stem into the stem-guiding sleeve 18, the sleeve 18 and the plugs 5 and 6 are assembled with the block 1 and, if the bottom closure 7 has not already been permanently secured to the block 1, the closure 7 is at this time also assembled with the block 1. The plugs 5 and 6 are so rotated that the planes of their seat surfaces intersect to form a dihedral angle (which may include an angle 0°, in which event the planes of said seats are parallel) which is bisected by the axis of the valve stem, the valve head being interposed between these seat surfaces. The parts are now assembled within a very strong jig capable of forcing the plugs 5 and 6 with substantial pressure against the valve head while at the same time holding the stem guide 18 firmly seated against the shoulder 16 and holding the bottom closure 7 in contact with the under surface of the block 1. While the parts are thus assembled, welding metal is applied at 37, 38 and 39, and also at 15, if not previously applied at the latter point, so as to form annuli of the welding metal molecularly and permanently uniting the several parts of the valve body, it being emphasized that at this time the valve seats are very firmly pressed against the opposite seat-engaging surfaces of the valve head. These annuli of welding metal are preferably so formed as to provide smooth fillets at the junctions of the several parts so that the cross sectional thickness of the valve structure increases gradually from the outer surface of the plug to the outer surface of the body portion, thereby preventing severe internal stresses such as result from sudden changes in temperature in a part whose cross section varies suddenly from point to point; these fillets also imparting a pleasing and finished appearance to the completed valve. The parts are held in the jig and under pressure until the welding metal has cooled. When the welding metal has cooled the valve may be opened by turning the valve stem thus retracting the valve head from between the seats. Since the seats and seat-engaging surfaces of the valve head are accurately smooth and since the parts are put together with the seats firmly engaging the valve head, the valve seats, close, with great accuracy, and may be opened and closed with little effort, so that the valve stem and hand wheel may be substantially smaller and lighter in weight than is usual in a valve of the same capacity; moreover since the opposing surfaces of the head and seats are wear-resistant, the valve will maintain its accuracy for a very long period.

While one desirable embodiment of the invention has been disclosed by way of example, it is to be understood that the invention is not necessarily limited to this precise embodiment but is to be regarded as broadly inclusive of any and all modifications falling within the scope of the appended claim.

We claim:

A gate valve body comprising a solid, unitary, homogeneous block of steel having intersecting vertical and horizontal bores which extend completely through the block and whose intersection forms the valve chamber, the opposite end portions of the horizontal bore constituting inlet and outlet sockets, an inlet plug and an outlet plug each of bar stock and each having an axial flow passage, one end portion of each plug being of an external diameter such as to fit snugly within the inlet and outlet sockets respectively of the block, an annulus of wear-resistant metal molecularly united to the inner end of each plug, each annulus having an accurately finished surface constituting a valve seat, the seat surfaces of the two annuli being located in planes which intersect to form a dihedral angle whose apex is bisected by the axis of the vertical bore in the block, the outer end portion of each plug being of a greater external diameter than the opposite end which fits into the socket in the block, the inner and outer end portions of each plug being externally cylindrical and meeting at a radial shoulder, the radial shoulder of each plug being spaced from the outer surface of the block, the block having an integral annular bonnet portion at its top, coaxial with the vertical bore in the block, the bonnet portion having an internal horizontal annular shoulder in a plane above the valve chamber, a stem-guiding sleeve whose lower end portion fits snugly within the bonnet portion of the bock and which rests upon said horizontal shoulder, an annulus of welding metal which embraces said sleeve and whose lower part rests upon and is of the same external diameter as the upper edge of the bonnet, said annulus being molecularly united to both sleeve and bonnet and tapering upwardly so that its upper end is of the same diameter as the outside diameter of the sleeve, an annular mass of welding metal embracing each of said plugs and filling the space between the shoulder of each plug and the adjacent surface of the block, each of said latter annuli being molecularly united to its respective plug and to the block, the welding metal of said annuli being so externally shaped as to form smooth external fillets and to provide a gradual increase in radial thickness of the welding metal from the outer surface of the plug to the outer surface of the body, thereby to avoid sudden changes in cross sectional thickness of the valve structure, a solid bottom plug which closes the lower end of the vertical bore in the block, and welding metal molecularly uniting the bottom plug to the block.

EARLE F. ALLEN.
LEWIS M. BURROWS.

REFERENCES CITED

The following references are of record in the file of this patent:

UNITED STATES PATENTS

| Number | Name | Date |
|---|---|---|
| 1,642,242 | Gray | Sept. 13, 1927 |
| 1,650,969 | Thoman | Nov. 29, 1927 |
| 1,674,076 | Weatherhead, Jr. | June 19, 1928 |
| 1,693,032 | Henry | Nov. 27, 1928 |
| 1,743,413 | Weatherhead, Jr. | Jan. 14, 1930 |
| 1,836,374 | Kelly | Dec. 15, 1931 |
| 1,916,738 | Miller, Jr. | July 4, 1933 |
| 2,128,111 | Woods | Aug. 23, 1938 |

FOREIGN PATENTS

| Number | Country | Date |
|---|---|---|
| 13,035 | Great Britain | of 1914 |
| 515,095 | Great Britain | of 1937 |
| 529,169 | Germany | of 1913 |